US011259230B2

(12) United States Patent
Ma et al.

(10) Patent No.: US 11,259,230 B2
(45) Date of Patent: Feb. 22, 2022

(54) METHOD AND SYSTEM OF SWITCHING BETWEEN MOBILE NETWORKS

(71) Applicant: SHENZHEN UCLOUDLINK NEW TECHNOLOGY CO., LTD., Shenzhen (CN)

(72) Inventors: Zhanlin Ma, Shenzhen (CN); Shu He, Shenzhen (CN)

(73) Assignee: SHENZHEN UCLOUDLINK NEW TECHNOLOGY CO., LTD, Shenzhen (CN)

(*) Notice: Subject to any disclaimer, the term of this patent is extended or adjusted under 35 U.S.C. 154(b) by 0 days.

(21) Appl. No.: 16/865,289

(22) Filed: May 1, 2020

(65) Prior Publication Data

US 2020/0260354 A1   Aug. 13, 2020

Related U.S. Application Data

(63) Continuation-in-part of application No. PCT/CN2019/078670, filed on Mar. 19, 2019.

(30) Foreign Application Priority Data

Jul. 9, 2018  (CN) .......................... 201810745332.0

(51) Int. Cl.
*H04W 36/36*   (2009.01)
*H04W 8/24*    (2009.01)
(Continued)

(52) U.S. Cl.
CPC ......... *H04W 36/365* (2013.01); *H04W 8/245* (2013.01); *H04W 36/14* (2013.01);
(Continued)

(58) Field of Classification Search
CPC ........... H04W 4/24; H04W 4/50; H04W 4/60; H04W 4/70; H04W 8/18; H04W 8/183;
(Continued)

(56) References Cited

U.S. PATENT DOCUMENTS

2010/0311468 A1* 12/2010 Shi .................... H04W 12/06
                                                                      455/558
2011/0306318 A1* 12/2011 Rodgers ................ H04L 67/16
                                                                      455/410

(Continued)

*Primary Examiner* — Ernest G Tacsik
(74) *Attorney, Agent, or Firm* — Robert L. Stearns; Dickinson Wright, PLLC

(57) ABSTRACT

A method of switching between mobile networks comprises the steps of: receiving, by a server, a mobile network switching request from the communication terminal input by a user; outputting, by the server, a list of mobile networks where the communication terminal is currently located to the user in response to receiving the mobile network switching request from the communication terminal; acquiring, by the communication terminal, a switched-to mobile network selected by the user from the list of mobile networks; allocating, by the server, a SIM card corresponding to the switched-to mobile network to the communication terminal; and switching, by the communication terminal, a switched-from mobile network to the switched-to mobile network by means of the SIM card. The problems in the prior art of being unable to freely change a virtual subscriber identity model card and switch a corresponding mobile network are effectively solved, thereby improving the user experience.

6 Claims, 4 Drawing Sheets

(51) Int. Cl.
*H04W 36/14* (2009.01)
*H04W 48/14* (2009.01)
*H04W 48/16* (2009.01)
*H04W 48/18* (2009.01)

(52) U.S. Cl.
CPC .......... *H04W 48/14* (2013.01); *H04W 48/16* (2013.01); *H04W 48/18* (2013.01)

(58) Field of Classification Search
CPC . H04W 8/205; H04W 8/245; H04W 12/0023; H04W 12/06; H04W 12/04; H04W 12/08; H04W 36/14; H04W 36/365; H04W 48/14; H04W 48/16; H04W 48/18; H04W 88/06; H04L 63/0853
See application file for complete search history.

(56) References Cited

U.S. PATENT DOCUMENTS

| | | | |
|---|---|---|---|
| 2016/0246611 A1* | 8/2016 | Li | H04W 12/08 |
| 2019/0037335 A1* | 1/2019 | Steck | H04W 8/205 |
| 2019/0110154 A1* | 4/2019 | Jantzi | H04L 67/34 |
| 2019/0349743 A1* | 11/2019 | Hamblet | H04M 15/64 |

\* cited by examiner

METHOD AND SYSTEM OF SWITCHING BETWEEN MOBILE NETWORKS

CROSS-REFERENCE TO RELATED APPLICATION

The present application is a Continuation-in-Part of PCT Patent Application Ser. No. PCT/CN2019/078670, filed on Mar. 19, 2019, which claims priority to Chinese Patent Application Ser. No. CN201810745332.0, filed on Jul. 9, 2018, the entire disclosures of which are incorporated herein by reference in their entireties.

TECHNICAL FIELD

The present disclosure relates to the field of communication technology, and particularly to a method of switching between mobile networks.

BACKGROUND

With the popularity of mobile devices and Internet technologies, people have put forward more demands on communication services. When users use mobile devices overseas, in order to quickly experience the network services provided by local mobile operators and enjoy lower tariffs, the process of replacing the physical Subscriber Identity Module card (SIM card) in the mobile device is eliminated, and a virtual SIM card is launched, the user only needs to download a virtual SIM card to the mobile device through the network, and register the local network, then Internet access and data services can be realized.

In order to further improve the convenience brought by the virtual SIM card and expand the scope of use thereof, an existing mobile device can detect the surrounding network environment according to the geographical location, automatically select the optimal mobile operator network for the user through systematic analysis and processing, and configure a new virtual SIM card to the mobile device through the server, so as to acquire the best Internet experience.

However, the above processes are completely determined by the system, and the user has no choice. When the user uses a mobile device to access the Internet, although the system provides the best way to access the Internet, the user actually has a poor Internet experience, at this time, the system has no corresponding measures to solve such problems.

SUMMARY

The present disclosure provides a method of switching between mobile networks, which aims to solve the problem in the prior art that users are unable to freely change a virtual Subscriber Identity Module card and switch a corresponding mobile network.

The present disclosure provides a method of switching between mobile networks performed on a communication terminal, including steps of:

receiving, by a server, a mobile network switching request from the communication terminal input by a user;

outputting, by the server, a list of mobile networks where the communication terminal is currently located to the user in response to receiving the mobile network switching request from the communication terminal;

acquiring, by the communication terminal, a switched-to mobile network selected by the user from the list of mobile networks; and allocating, by the server, a SIM card corresponding to the switched-to mobile network to the communication terminal, and switching, by the communication terminal, a switched-from mobile network to the switched-to mobile network by means of the SIM card.

The embodiments of the present disclosure provide a method of switching between mobile networks, a mobile network switching request from the communication terminal input by a user is received by a server, a list of mobile networks where the communication terminal is currently located is output to the user by the server in response to receiving the mobile network switching request from the communication terminal, a switched-to mobile network selected by the user from the list of mobile networks is acquired by the communication terminal, a SIM card corresponding to the switched-to mobile network is allocated to the communication terminal by the server, and a switched-from mobile network is switched to the switched-to mobile network by the communication terminal by means of the SIM card. In this way, the problem in the prior art that the user cannot freely replace the virtual Subscriber Identity Module card and switch the corresponding mobile network is effectively solved, thereby improving the user experience.

BRIEF DESCRIPTION OF THE DRAWINGS

For a more complete understanding of the present disclosure, reference should now be made to the embodiments illustrated in greater detail in the accompanying drawings and described below by way of examples of the present disclosure.

DETAILED DESCRIPTION OF THE EMBODIMENTS

In order to make the objectives, technical solutions, and advantages of the present disclosure clearer, the present disclosure is further described in detail below with reference to the accompanying drawings and embodiments. It should be understood that the specific embodiments described herein are only used to explain the present disclosure and are not intended to limit the present disclosure.

In the embodiments of the present disclosure, the communication terminal may be a mobile phone, a tablet computer, etc., the mobile network may be a cellular network or wireless fidelity network, the cellular network includes 2G (2nd Generation), 3G (3rd Generation), 4G (4th Generation) networks, etc., and the SIM card is a virtual Subscriber Identity Module card.

Embodiment One

Figure 1:
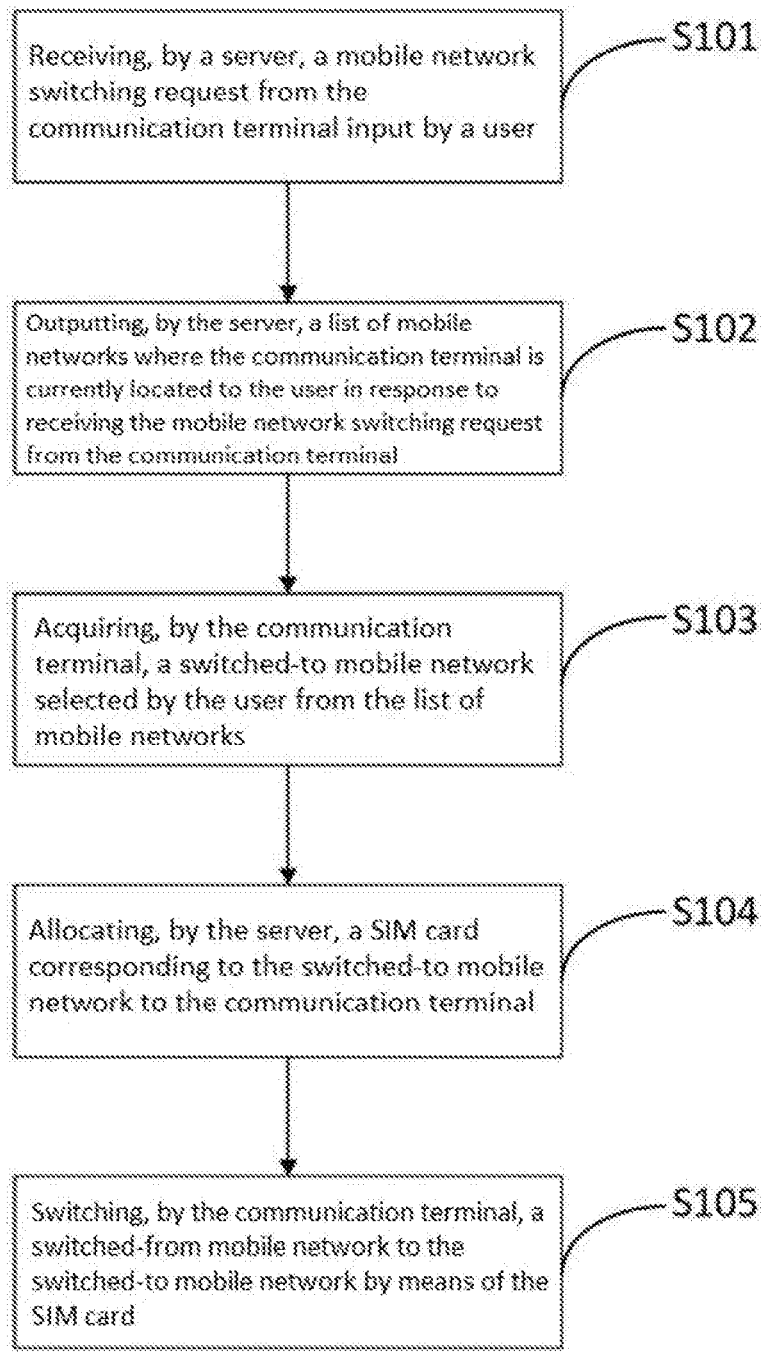
FIG. 1 is a flowchart of implementing a method of switching between mobile networks provided by Embodiment one of the present disclosure.

As shown in FIG. 1, an embodiment of the present disclosure provides an implementation process of a method of switching between mobile networks performed on a communication terminal, and details are as follows:

In step S101, a mobile network switching request from the communication terminal input by a user is received by a server.

In the embodiment of the present disclosure, receiving a mobile network switching request from the communication terminal input by a user may be implemented through an application interface or a voice input of a communication terminal.

In step S102, a list of mobile networks where the communication terminal is currently located is output to the user by the server in response to receiving the mobile network switching request from the communication terminal.

In the embodiment of the present disclosure, the communication terminal searches for network information where the communication terminal is located according to the switching request, and then sends a service request of the network information to the server. After receiving the service request sent by the communication terminal, the server will configure the list of mobile networks where the communication terminal is currently located, and then send the list of mobile networks to the communication terminal. After receiving the list of mobile networks sent by the server, the communication terminal outputs the list of mobile networks where the communication terminal is currently located to the user.

In step S103, a switched-to mobile network selected by the user from the list of mobile networks is acquired by the communication terminal.

In step S104, a SIM card corresponding to the switched-to mobile network is allocated to the communication terminal by the server.

In the embodiment of the present disclosure, the communication terminal sends a SIM card replacement request for the switched-to mobile network to the server. After receiving the SIM card replacement request sent by the communication terminal, the server will configure a SIM card corresponding to the switched-to mobile network, and then send the SIM card to the communication terminal. After receiving the SIM card corresponding to the switched-to mobile network sent by the server, the communication terminal allocates the SIM card corresponding to the switched-to mobile network to the communication terminal.

In step S105, a switched-from mobile network is switched to the switched-to mobile network by the communication terminal by means of the SIM card.

In the embodiment of the present disclosure, a mobile network switching request from a the communication terminal input by user is received by a server, a list of mobile networks where the communication terminal is currently located is output to the user by the server, a switched-to mobile network selected by the user from the list of mobile networks is acquired by the communication terminal, a SIM card corresponding to the switched-to mobile network is allocated to the communication terminal by the server, and a switched-from mobile network is switched to the switched-to mobile network by the communication terminal by means of the SIM card. In this way, the problem in the prior art that the user cannot freely replace the virtual Subscriber Identity Module card and switch the corresponding mobile network is effectively solved, thereby improving the user experience.

Embodiment Two

Figure 2:
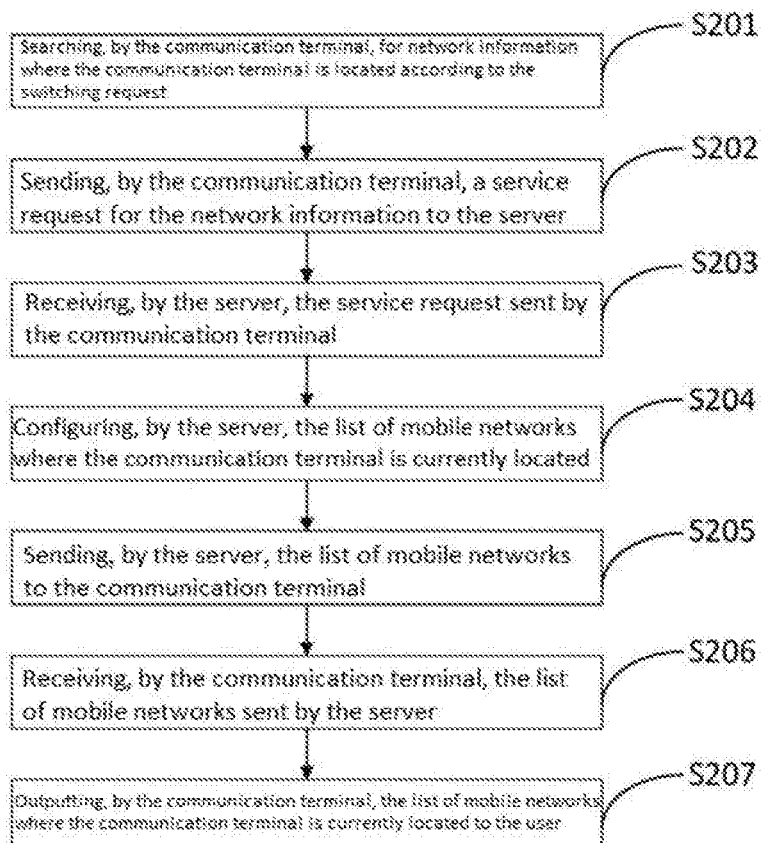
FIG. 2 is a flowchart of implementing a method of switching between mobile networks provided by Embodiment two of the present disclosure.

As shown in FIG. 2, an embodiment of the present disclosure further provides an implementation process of a method of switching between mobile networks performed on a communication terminal, details are as follows:

The above step of outputting, by the server, a list of mobile networks where the communication terminal is currently located to the user in response to receiving the mobile network switching request from the communication terminal specifically includes the following steps:

In step S201, the network information where the communication terminal is located is searched by the communication terminal according to the switching request.

In the embodiment of the present disclosure, the network information includes network signal strength, operator, and network standard.

In step S202, the service request of network information is sent to the server by the communication terminal.

In the embodiment of the present disclosure, the service request is to request the server to analyze the network information where the communication terminal is located and the historical network information preset by the server, and configure the list of mobile networks.

In step S203, the service request sent by the communication terminal is received by the server.

In step S204, the server configures the list of mobile networks where the communication terminal is currently located.

In the embodiment of the present disclosure, the list of mobile networks is configured by the following analysis method:

1) excluding the same operators currently;
2) excluding 2G networks;
3) excluding networks whose signal strength is less than a specified signal strength;
4) preferentially selecting network standards (4G≥3G);
5) in the case of the same standard, referring to the coverage quality of the operators (judging from big data).

After the above analysis, the list of mobile networks configured includes selectable mobile networks, network signal strengths, and network standards.

In step S205, the list of mobile networks is sent to the communication terminal by the server.

In step S206, the list of mobile networks sent by the server is received by the communication terminal.

In step S207, the list of mobile networks where the communication terminal is currently located is output to the user by the communication terminal.

In the embodiment of the present disclosure, the network information where the communication terminal is located is sent to the server, the server analyzes the preset historical network information and the network information where the communication terminal is located, configures the list of mobile networks, and sends the list of mobile networks to the communication terminal, thereby providing users with more comprehensive mobile network options, allowing users to freely choose the corresponding mobile network, and improving the user experience.

Embodiment Three

Figure 3:
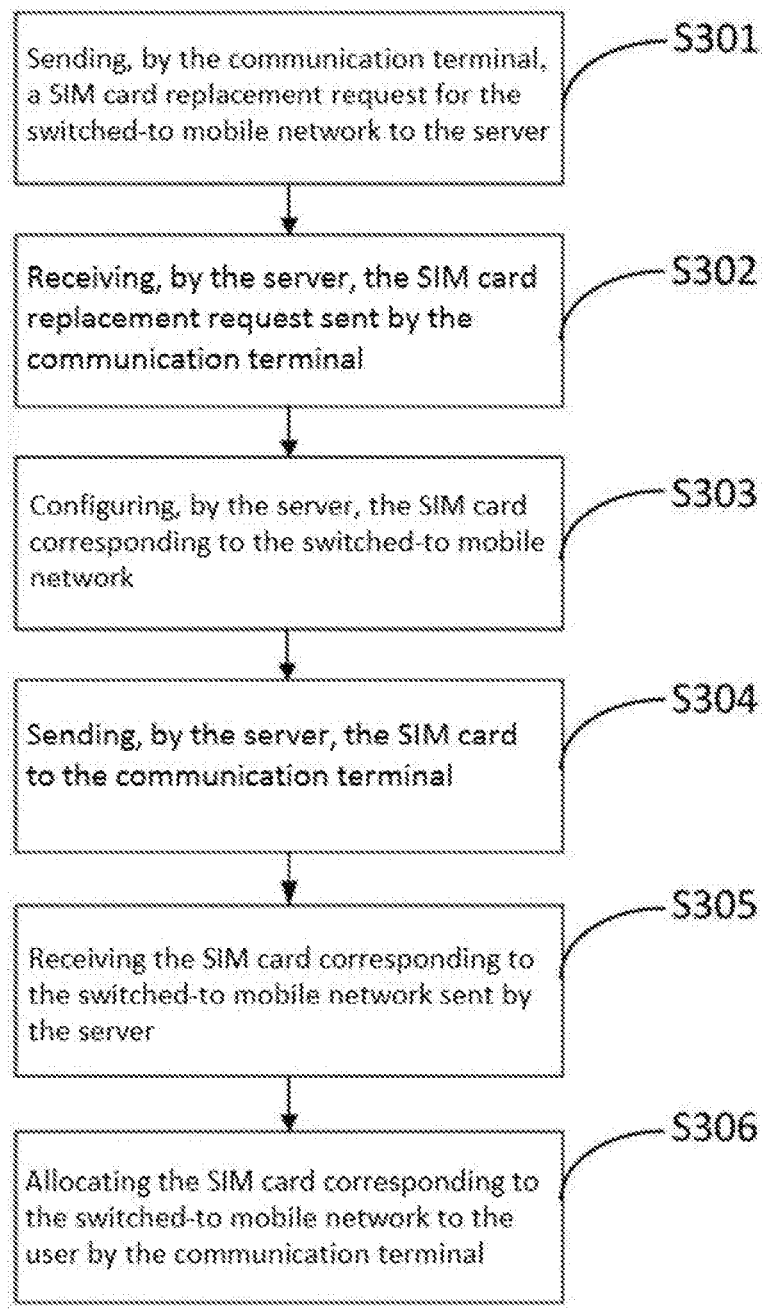
FIG. 3 is a flowchart of implementing a method of switching between mobile networks provided by Embodiment three of the present disclosure.

As shown in FIG. 3, an embodiment of the present disclosure further provides an implementation process of a method of switching between mobile networks performed on a communication terminal, details are as follows:

The above step of allocating, by the server, a SIM card corresponding to the switched-to mobile network to the communication terminal includes the following steps:

In step S301, the SIM card replacement request for the switched-to mobile network is sent to the server by the communication terminal.

In step S302, the SIM card replacement request sent by the communication terminal is received by the server.

In step S303, the SIM card corresponding to the switched-to mobile network is configured by the server.

In the embodiment of the present disclosure, the server searches for a SIM card matching the switched-to mobile network in a database according to the SIM card replacement request for the switched-to mobile network sent by the communication terminal, so that the communication terminal registers the switched-to mobile network through the SIM card for network communication.

In step S304, the SIM card is sent to the communication terminal by the server.

In step S305, the SIM card corresponding to the switched-to mobile network sent by the server is received by the communication terminal.

In step S306, the SIM card corresponding to the switched-to mobile network is allocated to the user by the communication terminal.

In the embodiment of the present disclosure, the SIM card replacement request for the switched-to mobile network is sent to the server, the server configures the SIM card corresponding to the switched-to mobile network, and sends it to the communication terminal, thereby enabling the user to use the switched-to mobile network and improving the user experience.

Embodiment Four

Figure 4:
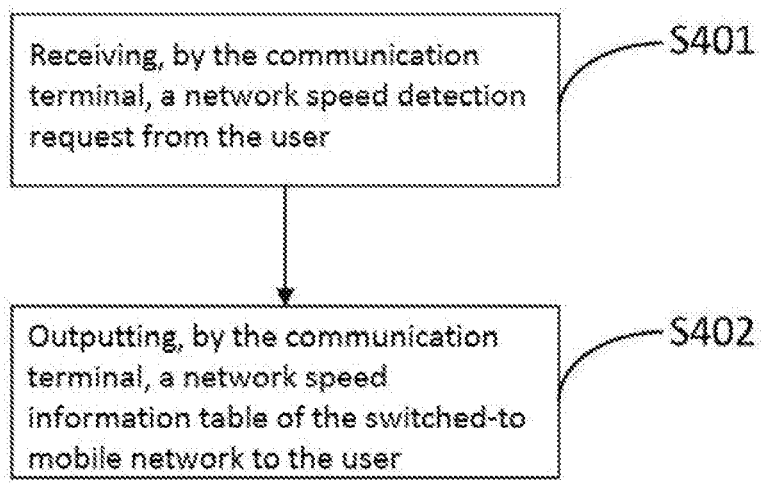
FIG. 4 is a flowchart of implementing a method of switching between mobile networks provided by Embodiment four of the present disclosure.

As shown in FIG. 4, an embodiment of the present disclosure further provides an implementation process of a method of switching between mobile networks performed on a communication terminal, details are as follows:

In step S401, a network speed detection request is received from the user by the communication terminal.

In the embodiment of the present disclosure, network speed detection may be performed by a detection program of the communication terminal, and network speed detection may also be performed by a third-party detection program.

In step S402, a network speed information table of the switched-to mobile network is output to the user by the communication terminal.

In the embodiment of the present disclosure, after the detection is completed, the communication terminal outputs the network speed information table of the switched-to mobile network to the user. The network speed information table includes uplink and downlink network speeds, jitter value, and packet loss rate.

In the embodiment of the present disclosure, after switching to a switched-to mobile network, the user can detect the network speed of the switched-to mobile network through a program of the communication terminal or a third-party application program, and the communication terminal outputs and displays the network speed information table of the switched-to mobile network to the user, thereby facilitating the user to understand the network speed of the switched-to mobile network, and further improving the user experience.

Embodiment Five

An embodiment of the present disclosure further provides an implementation process of a method of switching between mobile networks performed on a communication terminal, details are as follows:

When the user continues using the switched-to mobile network, a service instruction that the user selects the switched-to mobile network is acquired by the communication terminal.

In the embodiment of the present disclosure, according to the network speed information table of the switched-to mobile network, when the user thinks that the performance of the switched-to mobile network is good, he/she can choose to use the switched-to mobile network. After the communication terminal acquires the service instruction from the user, the communication terminal will continue using the switched-to mobile network, so as to facilitate the network use of the user.

Embodiment Six

An embodiment of the present disclosure further provides an implementation process of a method of switching between mobile networks performed on a communication terminal, details are as follows:

When the user no longer uses the switched-to mobile network, a mobile network switching instruction from the user is acquired by the communication terminal.

In the embodiment of the present disclosure, according to the network speed information table of the switched-to mobile network, when the user thinks that the performance of the switched-to mobile network is not good, he/she can choose to switch the switched-to mobile network to anther switched-to mobile network, and the communication terminal reconnects a new mobile network by using the method of Embodiment one of the present disclosure. In actual use, the user can continuously switch to different mobile networks by detecting the network speed, and it also allows the user to choose to switch to a previous switched-from mobile network and access the network for data communication through the SIM card corresponding to the previous switched-from mobile network, thereby providing the user with flexible and freely mobile network switching, and improving the user experience.

In summary, in the embodiments of the present disclosure, a mobile network switching request from the communication terminal input by a user is received by a server, a list of mobile networks where the communication terminal is currently located is output to the user by the server in response to receiving the mobile network switching request from the communication terminal, a switched-to mobile network selected by the user from the list of mobile networks is acquired by the communication terminal, a SIM card corresponding to the switched-to mobile network is allocated to the user by the server, and a switched-from mobile network is switched to the switched-to mobile network by the communication terminal by means of the SIM card. In this way, the problem in the prior art that the user cannot freely replace the virtual Subscriber Identity Module card and switch the corresponding mobile network is effectively solved, thereby improving the user experience.

The above are only preferred embodiments of the present disclosure, and are not intended to limit the present disclosure. Any modification, equivalent replacement, and improvement made within the spirit and principle of the present disclosure should be included in the protection scope of the present disclosure.

What is claimed is:

1. A method of switching between mobile networks performed on a communication terminal, comprising steps of:

searching, by the communication terminal, for network information where the communication terminal is located according to a network switching request input by a user, and sending, by the communication terminal, a service request of the network information to the server; wherein the mobile network switching request is a request to switch a mobile network operator currently providing service to- another mobile network operator to provide service;

receiving, by the server, the service request of the network information from the communication terminal;

outputting, by the server, a server configured list of mobile networks which are provided by different mobile network operators where the communication terminal is currently located to the user in response to receiving the service request of the network information from the communication terminal; wherein the server configured list of mobile network is configured by analyzing a preset historical network information and the network information where the communication terminal is located, and the analyzing comprises: excluding same mobile network operators currently; excluding 2G networks; excluding networks having a signal strength less than a specified signal strength; preferentially selecting network standards; and referring to a coverage quality of the mobile network operators by judging from big data, in the case of the same network standard;

acquiring, by the server, a switched-to mobile network selected by the user from the server configured list of mobile networks; and allocating, by the server, a virtual Subscriber Identity Module card corresponding to the switched-to mobile network to the communication terminal; and switching, by the communication terminal, a switched-from mobile network to the switched-to mobile network by means of the virtual Subscriber Identity Module card;

wherein the step of allocating, by the server, a virtual Subscriber Identity Module card corresponding to the switched-to mobile network to the communication terminal comprises:

sending, by the communication terminal, a Subscriber Identity Module card replacement request for the switched-to mobile network to the server;

receiving, by the server, the Subscriber Identity Module card replacement request sent by the communication terminal, and configuring, by the server, the virtual Subscriber Identity Module card corresponding to the switched-to mobile network;

sending, by the server, the virtual Subscriber Identity Module card to the communication terminal; and receiving, by the communication terminal, the virtual Subscriber Identity Module card corresponding to the switched-to mobile network sent by the server, and allocating, by the communication terminal, the virtual Subscriber Identity Module card corresponding to the switched-to mobile network to the user.

2. The method according to claim 1, wherein the step of outputting, by the server, a server configured list of mobile networks which are provided by different mobile network operators where the communication terminal is currently located to the user in response to receiving the service request of the network information from the communication terminal comprises:

configuring, by the server, the server configured list of mobile networks where the communication terminal is currently located;

sending, by the server, the server configured list of mobile networks to the communication terminal; and receiving, by the communication terminal, the server configured list of mobile networks sent by the server, and outputting, by the communication terminal, the server configured list of mobile networks where the communication terminal is currently located to the user.

3. The method according to claim 1, wherein the server configured list of mobile networks comprises:
selectable mobile networks,
network signal strengths, and
network standards.

4. The method according to claim 1, wherein after the step of allocating, by the server, a virtual Subscriber Identity Module card corresponding to the switched-to mobile network to the communication terminal; and switching, by the communication terminal, a switched-from mobile network to the switched-to mobile network by means of the virtual Subscriber Identity Module card, the method further comprises steps of:

receiving, by the communication terminal, a network speed detection request from the user; and outputting, by the communication terminal, a network speed information table of the switched-to mobile network to the user.

5. The method according to claim 4, further comprising a step of:

acquiring, by the communication terminal, a service instruction that the user selects the switched-to mobile network when the user continues using the switched- to mobile network, after the step of outputting, by the communication terminal, a network speed information table of the switched-to mobile network to the user.

6. The method according to claim 4, further comprising a step of:

acquiring, by the communication terminal, a mobile network switching instruction from the user when the user no longer uses the switched-to mobile network, after the step of outputting, by the communication terminal, a network speed information table of the switched-to mobile network to the user.

* * * * *